B. LORILLARD.

TOBACCO-PIPE.

No. 7,693. Reissued May 22, 1877.

Witnesses:
Michael Ryan
Geo. Hayes

Inventor
Pleasant Lorillard
by his Attorneys
Brown & Allen

UNITED STATES PATENT OFFICE.

BLASE LORILLARD, OF RHINEBECK, NEW YORK.

IMPROVEMENT IN TOBACCO-PIPES.

Specification forming part of Letters Patent No. 172,463, dated January 18, 1876; reissue No. 7,693, dated May 22, 1877; application filed May 1, 1877.

*To all whom it may concern:*

Be it known that I, BLASE LORILLARD, of Rhinebeck, in the county of Dutchess and State of New York, have invented certain new and useful Improvements in Tobacco or Smoking Pipes, of which the following is a description, reference being had to the accompanying drawing, forming part of this specification.

One of the objects of this invention is to prevent the disagreeable and injurious effects arising from the eminently poisonous and oily substance in tobacco called "nicotine," an alkaloid which, in a pure state, quickly liquefies on being exposed to the atmosphere, and is generally present in considerable quantities in the bowl of an ordinary pipe after the tobacco has been consumed. Its taste is very acrid, and is difficult to be eradicated from the mouth, and its very pungent and disagreeable odor is long retained by anything coming in contact with it, especially woolen or other clothing. Furthermore, it is injurious to health, and, if taken internally to any considerable extent, acts as a deadly poison.

In pipes, as heretofore constructed, the smoke necessarily passes or is drawn through the unburnt tobacco, which becomes sufficiently heated to set free more or less of the nicotine gas or oil, which is then drawn with the tobacco-smoke through the stem of the pipe into the mouth.

My invention consists in a smoking-pipe of novel construction, whereby the smoke is drawn through and from the fire of the burning tobacco without passing through the unburnt body or portion of the tobacco in the bowl of the pipe, and therefore the smoke from the tobacco which is drawn through the stem of the pipe into the mouth is free from the poisonous nicotine, and, consequently, the flavor and purity of the smoke remain the same at all times while the tobacco in the pipe is being smoked.

The invention also consists in a certain combination of parts in a pipe of such construction, whereby the advantages due to a withdrawal of the smoke or products of combustion without passing through the unburnt tobacco are obtained in a pipe made to provide for the combustion of the tobacco from below.

Figure 1:
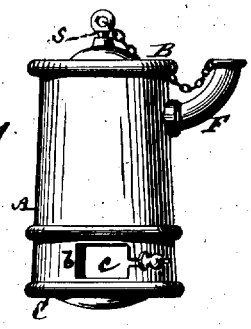
Figure 2:
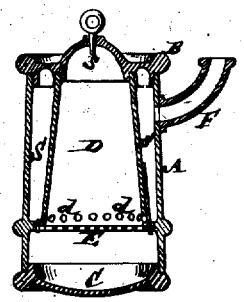

Figure 1 represents a side view of a base-burning tobacco-pipe constructed in accordance with my invention. Fig. 2 is a vertical section of the same, and Fig. 3 a plan of the part marked E in Fig. 2.

Figure 3:
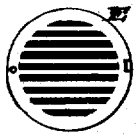

A represents an outer case or shell, which may be made of metal or any suitable material. This case is closed at the top by a cap, B, which may be screwed on, or made to slip in, the top a short distance, as shown. Said case is closed at the bottom by a piece, C, which may be permanently attached. D is the bowl or chamber in which the tobacco is burned. It is attached to or made to form a part of the cap B, and may be made of metal or other suitable material. The lower part of this chamber is closed by a disk, E, which is suitably perforated, or is of a slatted construction, as shown in Fig. 3, or it may be made of wire-cloth. This piece forms a grate, and supplies air to the tobacco, the combustion of which is from below. Said piece may be hinged to the chamber or bowl D, as shown in Figs. 2 and 3, or it may be permanently fixed to the outer shell A. Near the base of the bowl or chamber D are small perforations *d d*, through which the smoke is withdrawn, the portion of the outer case or shell A around said bowl and the exterior surface of the latter leaving a space between the bowl and the case, or, in other words, forming a smoke duct or chamber, S, which connects the bowl, through its perforations *d*, with the smoke-outlet or draft-tube F, to or with which the stem or mouth-piece of the pipe connects.

By this arrangement the smoke duct or chamber S connects the smoke-outlet or draft-tube F with the bowl or chamber D, in which the tobacco is burned, at the firing end of the bowl, or in closer proximity to the burning surface of the tobacco than to the remaining portion or body of it in the bowl, thus causing the smoke or products of combustion to be withdrawn without passing through the unburnt tobacco.

An opening is made in the outer shell A below the grate E, for inserting a lighter to ignite the tobacco, and for supplying air to it. Such an opening, *b*, is shown in Fig. 1, and the same represented as provided with a lid or door, *c*, for entirely or partially closing said opening after the pipe is lighted. There may also be a small tapering plug, *s*, arranged to fit an opening in the top of the outer shell, and attached to the pipe by a small chain.

When this plug is removed, a slight circulation of air is allowed, which serves to keep the fire from being extinguished when there is occasion to leave the pipe out of the mouth for a few minutes.

To fill the pipe, the cap B, and with it the bowl or tobacco holding and burning chamber D, may be removed from the outer shell. Said bowl or chamber D is made conical, to facilitate the automatic feed of the tobacco to the fire at the base of the bowl.

I claim—

1. The combination, with the bowl or chamber in which the tobacco is burned and the smoke-outlet or draft-tube, with which the stem or mouth-piece of the pipe connects, of a smoke duct or chamber arranged to connect said smoke outlet or draft-tube and said bowl at the firing end of the latter, and in closer proximity to the burning surface of the tobacco than to the remaining portion or body of it in the bowl, whereby the smoke is drawn through and from the fire of the burning tobacco without passing through the unburnt body or portion of the tobacco, substantially as specified.

2. A smoking-pipe in which are combined an outer shell, A, constructed to form a smoke-duct or chamber, and provided with a smoke-outlet or draft-tube, an inner chamber or bowl, D, and a grate, E, essentially as herein described.

BLASE LORILLARD.

Witnesses:
BENJAMIN W. HOFFMAN,
FRED. HAYNES.